(12) United States Patent
Gores et al.

(10) Patent No.: US 9,039,499 B2
(45) Date of Patent: May 26, 2015

(54) AIR GUIDING ELEMENT HAVING A FLOW CONTROL ELEMENT

(75) Inventors: Ingo Gores, Hamburg (DE); Andreas Edom, Hamburg (DE); Thorsten Raible, Hamburg (DE)

(73) Assignee: Airbus Operations GmbH (DE)

( * ) Notice: Subject to any disclaimer, the term of this patent is extended or adjusted under 35 U.S.C. 154(b) by 1558 days.

(21) Appl. No.: 12/603,938

(22) Filed: Oct. 22, 2009

(65) Prior Publication Data

US 2010/0192616 A1 Aug. 5, 2010

Related U.S. Application Data

(60) Provisional application No. 61/107,433, filed on Oct. 22, 2008.

(30) Foreign Application Priority Data

Oct. 22, 2008 (DE) .......................... 10 2008 052 794

(51) Int. Cl.
| | | |
|---|---|---|
| F25D 17/04 | (2006.01) | |
| B64D 13/00 | (2006.01) | |
| F24F 13/06 | (2006.01) | |
| F24F 13/24 | (2006.01) | |
| B64D 13/06 | (2006.01) | |

(52) U.S. Cl.
CPC ........ *B64D 13/00* (2013.01); *B64D 2013/0625* (2013.01); *F24F 13/06* (2013.01); *F24F 13/24* (2013.01)

(58) Field of Classification Search
USPC ............................................ 454/76, 284, 305
See application file for complete search history.

(56) References Cited

U.S. PATENT DOCUMENTS

| | | | | | |
|---|---|---|---|---|---|
| 1,607,003 | A | * | 11/1926 | King .............................. | 181/227 |
| 2,497,169 | A | * | 2/1950 | Herbert et al. .................... | 96/64 |
| 2,619,669 | A | * | 12/1952 | Cuddeback ..................... | 15/365 |
| 2,684,690 | A | * | 7/1954 | Lee ................. | 454/305 |
| 2,991,708 | A | * | 7/1961 | Falk et al. ..................... | 454/293 |
| 3,033,097 | A | * | 5/1962 | Phillips ........................ | 454/297 |
| 3,185,067 | A | * | 5/1965 | Batchelor ..................... | 454/293 |
| 3,220,332 | A | * | 11/1965 | Straub .......................... | 454/304 |
| 3,303,771 | A | * | 2/1967 | Nesher et al. ................. | 454/187 |

(Continued)

FOREIGN PATENT DOCUMENTS

| | | | |
|---|---|---|---|
| CN | 101275700 A | * | 10/2008 |
| DE | 2031876 | | 6/1970 |

(Continued)

OTHER PUBLICATIONS

Lee, KR2002068640 A, English abstract, Aug. 28, 2002.*

(Continued)

*Primary Examiner* — Alissa Tompkins
*Assistant Examiner* — Phillip E Decker
(74) *Attorney, Agent, or Firm* — Barnes & Thornburg LLP

(57) ABSTRACT

An air guiding element (10) for an aircraft air conditioning system comprises a housing base body (12), in which an air inlet opening (14) and an air outlet opening (16) are constructed. A first flow control element (28) is arranged in the housing base body (12), relative to the direction of the air flow through the air guiding element (10), upstream of the air outlet opening (16). The first flow control element (28) comprises a plurality of air guiding channels (30) which are surrounded by a noise-absorbing material (32).

12 Claims, 2 Drawing Sheets

(56) References Cited

U.S. PATENT DOCUMENTS

Figure 1:
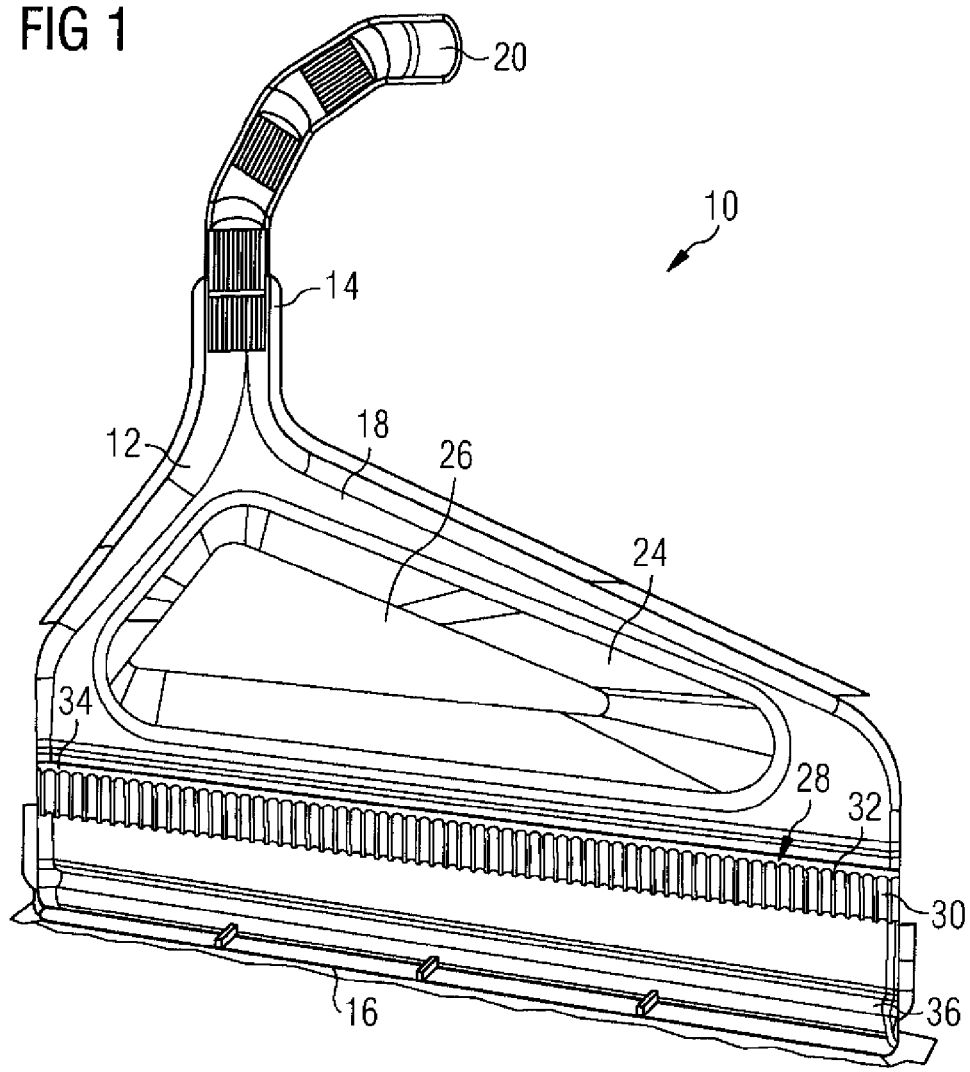

| | | | |
|---|---|---|---|
| 3,401,622 A * | 9/1968 | Honerkamp | 454/304 |
| 3,484,953 A * | 12/1969 | Norheim, Jr. | 434/258 |
| 3,492,934 A | 2/1970 | Steigerwald | |
| 3,714,884 A * | 2/1973 | Christiansen | 454/310 |
| 3,922,959 A | 12/1975 | Treffers | |
| 4,191,098 A * | 3/1980 | Gersch | 454/305 |
| 4,258,616 A * | 3/1981 | Zeller et al. | 454/303 |
| 4,471,213 A * | 9/1984 | Yoshida | 392/379 |
| 5,014,609 A * | 5/1991 | Weck | 454/237 |
| 5,114,382 A * | 5/1992 | Steiner | 454/76 |
| 5,295,905 A * | 3/1994 | Simble | 454/286 |
| 6,139,423 A * | 10/2000 | Wadey | 454/142 |
| 6,450,876 B2 * | 9/2002 | Elliot | 454/121 |
| 6,497,753 B1 * | 12/2002 | Gutmann | 96/55 |
| 6,776,710 B1 * | 8/2004 | Messmer et al. | 454/305 |
| 7,249,614 B2 * | 7/2007 | Vakili | 138/39 |
| 8,118,648 B2 * | 2/2012 | Bruggen et al. | 454/76 |
| 2002/0114697 A1 * | 8/2002 | Hsiorn et al. | 415/175 |
| 2008/0153410 A1 * | 6/2008 | Naber et al. | 454/347 |
| 2008/0268762 A1 * | 10/2008 | Bruggen et al. | 454/76 |
| 2010/0099347 A1 * | 4/2010 | Raible et al. | 454/76 |
| 2011/0294409 A1 * | 12/2011 | Edom et al. | 454/76 |

FOREIGN PATENT DOCUMENTS

| | | | |
|---|---|---|---|
| DE | 2402902 | 1/1973 | |
| DE | 10 2007 019 538 A1 | 10/2008 | |
| EP | 0292033 | 11/1988 | |
| EP | 1059178 | 12/2000 | |
| GB | 1462393 | 1/1977 | |
| GB | 1551401 A * | 8/1979 | |
| WO | WO 8903961 A1 * | 5/1989 | F24F 13/06 |

OTHER PUBLICATIONS

Scherman et al, DE 102007019538 A1 English machine translation, Oct. 30, 2008.*
Qingchuan et al, CN 101275700 A English abstract, Oct. 1, 2008.*
Lee, KR 2002068640 A English abstract, Aug. 28, 2002.*
Fang et al, CN 101275700 A English abstract, Oct. 1, 2008.*
Schermann et al, DE 102007019538 A1 English machine translation, Oct. 30, 2008.*

* cited by examiner

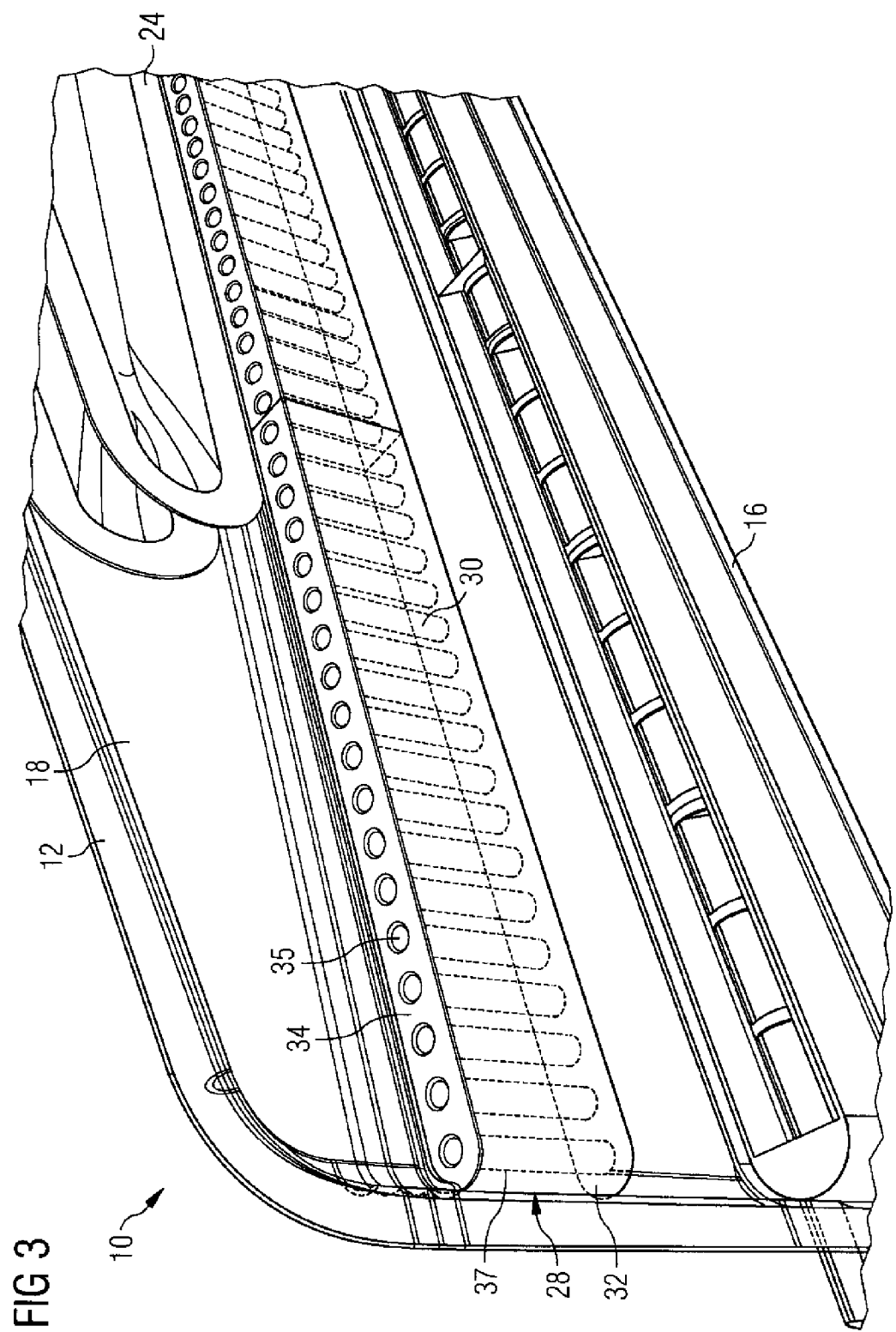

AIR GUIDING ELEMENT HAVING A FLOW CONTROL ELEMENT

CROSS-REFERENCE TO RELATED APPLICATION

This application claims priority to U.S. Provisional Patent Application No. 61/107,433 filed Oct. 22, 2008 and German Patent Application No. 10 2008 052 794.7, filed Oct. 22, 2008, the disclosures of which are incorporated herein by reference.

The invention relates to an air guiding element for an aircraft air conditioning system which is used, for example, to direct conditioned air provided by the aircraft air conditioning system into a passenger cabin of the aircraft. The invention further relates to an aircraft air conditioning system which is provided with such an air-guiding element.

An aircraft air conditioning system comprises a large number of air-guiding elements to which air which flows via an air inlet opening through a duct system of the aircraft air conditioning system is supplied and which are used to direct the conditioned air which is provided by the aircraft air conditioning system into the passenger cabin of the aircraft. An air guiding element known from the unpublished DE 10 2007 019 538 comprises a housing base body having an air inlet opening, a diffusor region and an air outlet opening. In order to control the flow distribution in the diffusor region, at least one recess which narrows the flow cross-section of the housing base body is formed in a generated surface of the housing base body. An aperture which is arranged in the region of the air outlet opening is used to optimise the flow distribution during discharge from the air outlet opening.

In air guiding elements known from the prior art, in particular when the air inlet opening is not arranged centrally relative to the diffusor region, the problem may occur that the impulse of the air flow which is directed in the direction of the air flow through the air inlet opening cannot be eliminated to a sufficient degree. This can lead to the air flow not being discharged in the desired direction through the air inlet opening and out of the air outlet opening, but instead to the air being discharged at an angle, that is to say, inclined relative to the desired discharge direction. Furthermore, with known air guiding elements, there is the problem that only noise which is produced in supply pipes which are connected to the air guiding elements is eliminated by means of noise-absorbing pipes. In contrast, noise which occurs when air flows through the air guiding elements and when the air flow is discharged from the air guiding elements, for example, owing to redirection of the air flow or flow separations caused by abrupt changes in the flow cross-section, enters the aircraft cabin in an undamped state.

The object of the present invention is to provide an air guiding element which is suitable for use in an aircraft air conditioning system and which allows a uniform and gentle discharge of air over a cross-section of an air outlet opening in a desired direction.

In order to achieve this object, an air guiding element according to the invention for an aircraft air conditioning system comprises a housing base body, in which an air inlet opening and an air outlet opening are constructed. The housing base body may comprise, for example, a plastics material, a plastics material having a honeycomb structure, a glass-fibre-reinforced plastics material, a carbon-fibre-reinforced plastics material or a hybrid material. In the housing base body, a first flow control element, relative to the direction of the air flow through the air guiding element, is arranged upstream of the air outlet opening. The first flow control element comprises a plurality of air guiding channels. The first flow control element brings about a back-draught and a redirection of the air flowing through the air guiding element and consequently serves to control the distribution and the discharge angle of the air flow being discharged from the air outlet opening. Owing to the air guiding channels, the direction of the air flow prior to its being discharged from the air outlet opening can be controlled as desired. In particular, an impulse of the air flow which is directed in the direction of the air flow through the air inlet opening can be eliminated before the air flow is discharged from the air outlet opening to the extent that the air is discharged from the air outlet opening in the desired direction. Furthermore, the air guiding channels reduce or prevent occurrences of turbulence in the air flow flowing through the air guiding channels.

The number of air guiding channels constructed in the first flow control element can be adapted in accordance with the desired flow control characteristics of the first flow control element. In a similar manner, the flow cross-section of the air guiding channels can be selected in accordance with the desired flow control characteristics of the first flow control element. If required, the first flow control element can be provided with air guiding channels which have flow cross-sections which are the same or different. In the same manner, the distribution of the air guiding channels over the flow cross-section of the housing base body in the region of the first flow control element can be adapted in accordance with application-specific requirements.

In the air guiding element according to the invention, the air guiding channels of the first flow control element are surrounded by a noise-absorbing material. As a noise-absorbing material, it is possible to use a foam material having a degree of rigidity which is as high as possible, and an erosion rate which is as low as possible, for example, a polyimide foam or a melamine foam, such as, for example, a Basotec® foam. Owing to the fact that the air guiding channels of the first flow control element are embedded in a noise-absorbing material, noise which occurs when air passes through the narrowed flow cross-section in the region of the first flow control element can be damped in an effective manner. When the air guiding element according to the invention is used in an aircraft air conditioning system, this can lead to a considerable increase in comfort for passengers in the aircraft cabin.

The first flow control element may comprise a base plate. The air guiding channels can then be formed by flow openings which are formed in the base plate and sleeve or nozzle elements which extend from the base plate in the direction of the air flow through the air guiding element, that is to say, from the base plate in the direction towards the air outlet opening. The base plate and the sleeve elements may be formed from a plastics material, a glass-fibre-reinforced plastics material, a carbon-fibre-reinforced plastics material or a hybrid material. A flow control element which is formed by a base plate and by sleeve elements which extend from the base plate meets the requirements relating to the function of the first flow control element and can at the same time be produced so as to be particularly lightweight.

The flow openings formed in the base plate are preferably provided with an inflow radius in the region of a surface of the base plate facing away from the air outlet opening, that is to say, in the region of a surface of the base plate against which the air flow directed through the air guiding element flows. That is to say, the flow openings formed in the base plate have, in the region of the surface of the base plate against which air flows, no sharp edges but instead a "soft" form. Occurrences of turbulence which are brought about as the air flows through the narrowed flow cross-section of the flow openings are thereby minimised.

The air guiding channels of the first flow control element can also be formed by means of pivotably supported sleeve elements. The pivotably supported sleeve elements can, for example, be arranged in a suitable supporting structure. Air guiding channels which are formed by pivotably supported sleeve elements allow particularly flexible flow control so that, for example, in various portions of the air outlet opening, different air discharge directions can be adjusted. The first flow control element can also be configured in such a manner that some of its air guiding channels are formed by sleeve elements which are fixed in a rigid manner to a base plate, and some of its air guiding channels are formed by pivotably supported sleeve elements. The pivotably supported sleeve elements, in a similar manner to sleeve elements which are fixed in a rigid manner to a base plate, can comprise a plastics material, a glass-fibre-reinforced plastics material, a carbon-fibre-reinforced plastics material or a hybrid material.

The air guiding channels may have a constant flow cross-section. Alternatively, however, the air guiding channels may also have a flow cross-section which tapers in the direction of the air flow through the air-guiding channels. For example, an inlet flow cross-section of the air guiding channels may be from 1.5 to 2 times as large as the outlet flow cross-section thereof. The flow cross-section of the air guiding channels can be shaped as desired. Preferably, however, the air guiding channels may have a circular flow cross-section.

The noise-absorbing effect of the noise-absorbing material which surrounds the air guiding channels of the first flow control element can be optimised by means of direct contact between the noise-absorbing material and the air which flows through the air guiding channels. For this reason, air guiding channel walls which adjoin the noise-absorbing material which surrounds the air guiding channels are preferably provided with a plurality of perforation openings. For example, the through-openings can be formed in the sleeve elements which delimit air guiding channels. If the perforation openings have a circular flow cross-section, the diameter thereof may be, for example, approximately 0.5 mm.

The first flow control element can be constructed in one piece and extend over the entire flow cross-sectional area of the housing base body. Alternatively, however, the flow cross-sectional area of the housing base body, in the region of the first flow control element, can also be sub-divided into several portions. A first flow control element can then be arranged in at least one of these portions. Preferably, however, a first flow control element is arranged in each of these portions. That is to say, the air guiding element according to the invention may also have a plurality of first flow control elements which are each associated with a portion of the flow cross-sectional area of the housing base body. The first flow control elements can then be constructed differently, for example, in terms of the number, arrangement, orientation and the configuration of the flow cross-section of the air guiding channels. It is thereby possible to produce different flow control characteristics of the first flow control element in the various portions of the flow cross-sectional area of the housing base body.

In the air guiding element according to the invention, a diffusor region is provided in the housing base body, relative to the direction of the air flow through the air guiding element, preferably upstream of the first flow control element. The diffusor region serves to distribute the air which is supplied via the air inlet opening in order to achieve the most uniform air discharge possible over the air outlet opening. The diffusor region should be constructed in such a manner that occurrences of flow separation and turbulence are avoided to the greatest possible extent. An optimal diffusor opening angle with regard to preventing occurrences of flow separation and turbulence is approximately from 7 to 8°. The configuration of the diffusor region is therefore carried out within the scope of existing installation space restrictions, with such occurrences of optimisation with respect to fluid technology being taken into account, where possible. Furthermore, radii provided in the diffusor region of the air guiding element according to the invention should be optimised with respect to fluid technology, that is to say, constructed in the "softest" manner possible.

In order to optimise the flow distribution characteristics of the diffusor region, in the air guiding element according to the invention it is possible for at least one recess which narrows the flow cross-section of the housing base body to be formed in a generated surface of the housing base body. The recess preferably comprises a base face which is recessed in the direction of the interior of the housing base body relative to the outer surface of the housing base body and transition faces which connect the base face to the generated surface of the housing base body which surrounds the recess. The shape of the recess is preferably adapted to the shape of the diffusor region, that is to say, the recess preferably has a substantially triangular base face, a "tip" of the triangular base face facing the air inlet opening. The air outlet opening in contrast faces the "flat side" of the triangular recess base face.

The recess which is formed in the generated surface of the housing base body is arranged in the flow path of the air which flows through the air guiding element and directs the air flow in the desired direction. In order to prevent occurrences of flow separation and turbulence, the recess should also be constructed with "soft" radii.

Only one recess may be formed in the generated surface of the housing base body. The base face of the recess is then preferably arranged substantially parallel to a generated surface portion which is opposite the base face of the recess. That is to say, the spacing between the recess base face and the generated surface portion opposite the recess base face is preferably constant over the entire recess base face. Alternatively, two recesses which are opposite each other can also be formed in the generated surface of the housing base body. In such a case, the recesses preferably have the same shapes. The base face of a recess is then preferably arranged substantially parallel to a base face of the other recess opposite the base face. That is to say, the spacing between the base faces of two opposing recesses is constant over the base faces of the recesses.

In a particularly preferred configuration of the air guiding element according to the invention, the recess which is formed in the generated surface of the housing base body is filled with a noise-absorbing material. If a plurality of recesses are provided in the housing base body of the air guiding element, all the recesses are preferably filled with a noise-absorbing material. As a noise-absorbing material, it is again possible to use a foam material, such as, for example, a polyimide foam or a melamine foam, such as, for example, a Basotec® foam. Owing to the fact that the recess(es) is/are filled with a noise-absorbing material, noise which occurs in the region of the recess(es) when air flows through the air guiding element can be damped in an effective manner. It is thereby possible to further improve the acoustic characteristics of the air guiding element according to the invention.

In order to allow contact between the air flowing through the air guiding element and the noise-absorbing material which fills the recess, the base face of the recess is preferably provided with perforation openings. In addition to the base face, one or more transition faces of the recess may also be provided with perforation openings. However, transition faces of the recess against which air flows are intended to be constructed in an air-tight manner.

In order to prevent air from being discharged out of the air guiding element into the environment via the noise-absorbing material which fills the recess, a surface of the recess opposite the base face of the recess is preferably provided with an air-tight cover which covers the noise-absorbing material. The air-tight cover may comprise the same material as the housing base body. Alternatively, however, the air-tight cover can also be formed by an air-tight film.

Owing to the installation space restrictions which typically exist in the region of an aircraft cabin, it is often necessary to connect air guiding elements which are used to direct conditioned air which is provided by the aircraft air conditioning system into the passenger cabin to corresponding air supply lines with different connection angles. In order to avoid complex design modifications with air guiding elements which are intended to be installed at various installation space positions in the aircraft, the performance of the air guiding elements should be to the greatest possible extent independent of a connection angle of the air guiding element to an air supply line and consequently the inflow angle of the air into the air guiding element. In order to overcome this problem and to control the inflow angle of the air into the air guiding element as desired independently of the path of an air supply line, in the air guiding element according to the invention the air inlet opening of the housing base body is preferably connected to an inflow element. The inflow element may comprise a plurality of portions which are arranged in a mutually inclined manner. The inclination angle between two mutually adjacent portions of the inflow element may be, for example, ±30°. The individual portions of the inflow element can be formed by tubular elements whose flow cross-section may be constructed in a circular or elliptical manner. The length of an inflow element having a circular flow cross-section should not be less than the diameter of the flow cross-section.

Flow directing channels which are orientated parallel to the direction of the air flow through the inflow element may be formed in at least some of the portions of the inflow element. The flow directing channels may be formed, for example, by a honeycomb structure which is provided in the inflow element portions. Owing to the flow directing channels, typical occurrences of flow separation and flow acceleration, as occur in curved pipes without flow directing channels, can be reliably prevented.

In the region of the air inlet opening of the housing base body, in the air guiding element according to the invention, a flow cross-section narrowing may further be provided. For example, the flow cross-section narrowing may be positioned in the region of a transition between an inflow element and a diffusor region which, in the direction of the air flow through the air guiding element, is arranged downstream of the inflow element and the air inlet opening. The flow cross-section narrowing should be configured in a manner which promotes flow, that is to say, shaped in such a manner that no occurrences of flow separation are produced. The extent of the flow cross-section narrowing can be adapted as desired in accordance with the quantity of air passing through the air guiding element and depending on the inflow angle of the air into the air guiding element.

In order to further optimise the flow distribution on the air outlet opening and the discharge direction of the air from the air outlet opening, the air guiding element according to the invention may comprise a second flow control element which, relative to the direction of the air flow through the air guiding element, is arranged downstream of the first flow control element. In a similar manner to the first flow control element, the second flow control element may also comprise a plurality of air guiding channels. The air guiding channels of the second flow control element are preferably formed by means of pivotably supported sleeve elements. The sleeve elements which form the air guiding channels of the second flow control element may again comprise a plastics material, a glass-fibre-reinforced plastics material, a carbon-fibre-reinforced plastics material or a hybrid material.

In the second flow control element, the sleeve elements can be pivoted in different directions in various portions of the second flow control element. The flow of air flowing through the air guiding element can thereby be separated into individual streams which are discharged from the air outlet opening of the air guiding element at different angles. It is thereby possible to achieve a greater air stream surface-area and consequently more rapid mixing of the air which is directed through the air guiding element with the air in the aircraft cabin. Differences between the discharge speed of the air from the air guiding element and the mean cabin air speed and/or the temperature of the air supplied via the air guiding element and the temperature of the air in the cabin are therefore more rapidly equalised. Furthermore, if desired, air can be applied to specific regions of the cabin in an effective manner by appropriate orientation of the pivotably supported sleeve elements of the second flow control element.

In a similar manner to the first flow control element, in the second flow control element the flow control characteristics can also be controlled as desired by means of an appropriate number and distribution of the air guiding channels and selection of a corresponding flow cross-section of the air guiding channels. The second flow control element may have air guiding channels with different flow cross-sections. Alternatively, however, the second flow control element can also be provided with air guiding channels which have the same flow cross-sections.

The air guiding channels of the second flow control element formed by the pivotably supported sleeve elements may be surrounded by a noise-absorbing material. As a noise-absorbing material, it is again possible to use a foam material having the highest possible level of rigidity and the lowest possible rate of erosion, for example, a polyimide foam or a melamine foam, such as, for example, a Basotec® foam. Owing to the integration of the air guiding channels of the second flow control element in a noise-absorbing material, noise which occurs when air flows through the narrowed flow cross-section in the region of the second flow control element can be effectively damped. This allows further optimisation of the acoustic characteristics of the air guiding element.

The flow cross-sectional area of the housing base body, in the region of the second flow control element as in the region of the first flow control element, can be sub-divided into a plurality of portions. In at least one of these portions, a second flow control element may be arranged. However, a second flow control element is preferably arranged in each of these portions. In particular when second flow control elements which are constructed differently in terms of their flow control characteristics are used in the individual portions of the flow cross-sectional area of the housing base body, the sub-division of the flow cross-sectional area of the housing base body into a plurality of portions allows particularly flexible flow control in this region.

The air guiding element according to the invention is particularly well suited for use in an aircraft air conditioning system. The air guiding element can be constructed in different sizes, but with all the significant parameters, such as, for example, size relationships, radii and angles, being intended to be modified relative to each other in the same proportions. An aircraft air conditioning system according to the invention comprises an air guiding element described above.

Figure 2:
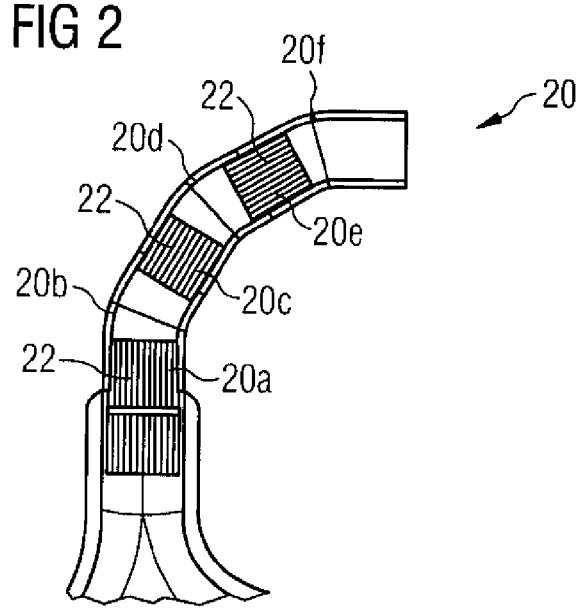

A preferred configuration of the air guiding element according to the invention will now be explained in greater detail with reference to the appended schematic drawings, in which:

FIG. 1 shows a three-dimensional illustration of an air guiding element for an aircraft air conditioning system, FIG. 2 shows a detailed illustration of an inflow element of the air guiding element according to FIG. 1, and FIG. 3 shows a three-dimensional detailed illustration of the air guiding element according to FIG. 1.

FIGS. 1 to 3 illustrate an air guiding element 10 which is provided for use in an aircraft air conditioning system. The air guiding element 10 comprises a housing base body 12, in which an air inlet opening 14 and an air outlet opening 16 are constructed. Between the air inlet opening 14 and the air outlet opening 16, that is to say, relative to the direction of the air flow through the air guiding element 10, downstream of the air inlet opening 14 and upstream of the air outlet opening 16, the housing base body 12 forms a diffusor region 18.

The air inlet opening 14 of the housing base body 12 is connected to an inflow element 20. The inflow element 20 comprises a plurality of portions 20a to 20f which are inclined relative to each other, the angle of inclination between mutually adjacent portions 20a to 20f of the inflow element 20 being approximately ±30°. The inflow element 20, in the same manner as the housing base body, comprises a plastics material, a glass-fibre-reinforced plastics material, a carbon-fibre-reinforced plastics material or a hybrid material.

As can best be seen in FIG. 2, flow directing channels 22 are formed in the portions 20a, 20c, 20e of the inflow element 20 and extend parallel to the direction of the air flow through the inflow element 20. The flow directing channels 20 are defined by a honeycomb structure which is formed in the portions 20a, 20c, 20e of the inflow element 20. Owing to the flow directing channels 22, occurrences of flow separation and flow acceleration are reliably prevented in the flow of air directed through the inflow element 20. The inflow element 20 consequently allows the air guiding element 10 to be connected to an air supply line which is arranged and orientated more or less as desired, without the inflow angle of the air into the air inlet opening 14 of the air guiding element 10 being influenced by the arrangement and the orientation of the air supply line in a manner which impairs the operation of the air guiding element 10.

Relative to the direction of the air flow through the air guiding element 10, downstream of the air inlet opening but upstream of the diffusor region 18, a component is arranged which narrows the flow cross-section of the housing base body 12 but which is not illustrated in greater detail in the Figures. The flow cross-section narrowing of the housing base body 12 is configured in such a manner that no occurrences of flow separation occur. The configuration of the flow cross-section narrowing is based on the quantity of air supplied to the air guiding element 10 and the inflow angle of the air in the air inlet opening 14.

The diffusor region 18 of the housing base body 12 is constructed in the most optimum manner possible in terms of fluid technology, that is to say, the opening angle of the diffusor region 18, in so far as this is possible under existing installation space restrictions, approximates to a diffusor opening angle of from 7 to 8° which is optimal with respect to the prevention of occurrences of flow separation and turbulence. Furthermore, radii which are provided in the diffusor region 18 are constructed so as to be as "soft" as possible in order to prevent occurrences of turbulence.

In order to improve the flow distribution characteristics of the diffusor region 18, a recess 24 which narrows the flow cross-section of the housing base body 12 is formed in a generated surface of the housing base body 12 in the diffusor region 18. The recess 24 comprises a base face 26 which is recessed relative to the generated surface of the housing base body 12 in the direction of the interior of the housing base body 12. The recess base face 26 is arranged substantially parallel to a generated surface portion opposite the recess base face 26, that is to say, the spacing between the recess base face 26 and the generated surface portion opposite the recess base face is constant over the entire recess base face 26.

The base face 26 of the recess 24 is shaped in a substantially triangular manner, a "tip" of the triangular base face 26 facing the air inlet opening 14. In contrast, a "flat side" of the recess base face 26 faces the air outlet opening 16. Triangle sides of the recess base face 26 which are adjacent to the triangle side of the recess base face 26 facing the air outlet opening 16 extend substantially parallel to the edges of the housing base body 12. The shape of the recess 24 thus follows the shape of the diffusor region 18 of the housing base body 12.

Owing to the recess 24, the air flowing through the air guiding element 10 is distributed and directed in the desired direction. It is therefore possible in the air guiding element 10 not to use an air guiding blade which is constructed as a separate component. The recess is optimised in terms of fluid technology, that is to say, is provided with "soft" radii to the greatest possible extent in order to prevent occurrences of flow separation and turbulence.

The recess 24 which is formed in the generated surface of the housing base body 12 is filled with a noise-absorbing foam material which is not illustrated in the Figures, such as, for example, a Basotec® foam. It is thereby possible for noise which occurs when air passes through the air guiding element 10 in the region of the recess 24 to be damped in an effective manner. In order to ensure adequate contact between the air flow passing through the air guiding element 10 and the noise-absorbing material, the base face 26 of the recess 24 is provided with a plurality of perforation openings. In order to prevent air from being discharged from the air guiding element 10 into the environment via the noise-absorbing material which fills the recess 24, a surface of the recess 24 opposite the base face 26, that is to say, a surface of the noise-absorbing material, is provided with an air-tight cover which is also not illustrated in greater detail.

Relative to the direction of the air flow through the air guiding element 10, a first flow control element 28 is arranged downstream of the diffusor region 18 in the housing base body 12. The first flow control element 28 comprises a plurality of air guiding channels 30 which are surrounded by a noise-absorbing material 32. A Basotec® foam is used as the noise-absorbing material 32. The first flow control element 28 brings about a back-draught and redirection of the air flowing through the air guiding element 10 and distribution of the air flow over the air outlet opening 16. Through the air guiding channels 30, the air is distributed in an optimum manner and directed in the desired direction. The noise-absorbing material which surrounds the air guiding channels 30 damps noise which occurs when the flow of air is directed through the air guiding channels 30.

As can best be seen in FIG. 3, the first flow control element 28 comprises a base plate 34. The air guiding channels 30 are formed by flow openings 35 formed in the base plate 34 and sleeve or nozzle elements 37 which extend from the base plate in the direction of the air flow through the air guiding element, that is to say, in the direction of the air outlet opening 16. The base plate 34 and the sleeve elements 37 comprise a plastics material, a glass-fibre-reinforced plastics material, a carbon-fibre-reinforced plastics material or a hybrid material. The flow openings 35 formed in the base plate 34 are provided, in the region of a surface of the base plate 34 facing away from the air outlet opening 16, that is to say, a surface against which air flows, with an inflow radius, that is to say, they have no sharp edges, but instead "soft" radii.

The air guiding channels 30 have a circular cross-section which is constant over the length thereof. In order to ensure adequate contact between the air flowing through the air guiding channels 30 and the noise-absorbing material 32 which surrounds the air guiding channels 30, the sleeve elements 37 which extend from the base plate 34 in the direction of the air outlet opening 16 are provided with a plurality of circular perforation openings. The diameter of the perforation openings is approximately 0.5 mm.

In the embodiment illustrated in the Figures, the first flow control element 28 extends over the entire flow cross-sectional area of the housing base body 12. Alternatively, however, the flow cross-sectional area of the housing base body 12, in the region of the first flow control element 28, may also be sub-divided into several portions. A first flow control element 28 may then be associated with each of these portions, wherein the flow control characteristics of the first flow control elements 28 may vary and may be able to be adapted to the specific requirements in the portions of the flow cross-sectional area of the housing base body 12.

Relative to the direction of the air flow through the air guiding element 10, a second flow control element 36 is arranged downstream of the first flow control element 28 and upstream of the air outlet opening 16 in the housing base body 12. The second flow control element 36 is illustrated only schematically in FIG. 1 and has, in the same manner as the first flow control element 28, a plurality of air guiding channels. In contrast to the first flow control element 28, in the second flow control element 36 the air guiding channels are formed by sleeve elements which are not rigidly fixed to a base plate but which are instead pivotably supported. The second flow control element 36 thereby allows particularly flexible flow control. If desired or required, the air guiding channels of the second flow control element formed by the pivotably supported sleeve elements may be surrounded by a noise-absorbing material, such as, for example, a Basotec® foam, in order to further optimise the acoustic characteristics of the air guiding element 10.

In a similar manner to the first flow control element 28, the second flow control element 36 extends in the embodiment illustrated over the entire flow cross-sectional area of the housing base body 12. Alternatively, however, the flow cross-sectional area of the housing base body 12, in the region of the second flow control element 36, may also be sub-divided into a plurality of portions, a separate second flow control element 36 with adapted flow control characteristics being able to be associated with each of these portions.

The invention claimed is:

1. Air guiding element (10) for an aircraft air conditioning system comprising:
   a housing base body (12), in which an air inlet opening (14) and an air outlet opening (16) are constructed,
   a first flow control element (28) arranged in the housing base body (12), relative to the direction of air flow through the air guiding element (10), upstream of the air outlet opening (16), the first flow control element (28) comprising a plurality of air guiding channels (30) surrounded by a noise-absorbing material (32),
   a diffusor region (18) arranged in the housing base body (12) upstream of the first flow control element, and
   a recess (24) formed in the diffusor region (18), the recess (24) having a base face (26) recessed relative to an outer surface of the housing base body (12) in a direction toward an interior of the housing base body (12), the base face (26) having at least three sides each separate from and extending parallel to a different peripheral edge of the housing base body (12).

2. Air guiding element according to claim 1, characterised in that the first flow control element (28) comprises a base plate (34) and in that the air guiding channels (30) are formed by flow openings (35) which are formed in the base plate (34) and sleeve elements (37) which extend from the base plate (34) in the direction of the air flow through the air guiding element (10).

3. Air guiding element according to claim 2, characterised in that the flow openings (35) in the base plate (34) are provided with an inflow radius in a region of a surface of the base plate (34) facing away from the air outlet opening (16).

4. Air guiding element according to claim 1, characterised in that the air guiding channels (30) are formed by sleeve elements.

5. Air guiding element according to claim 1, characterised in that the air guiding channels (30) have a constant flow cross-section or a flow cross-section which tapers in the direction of the air flow through the air guiding channels (30).

6. Air guiding element according to claim 1 characterised in that a flow cross-sectional area of the housing base body (12), in a region of the first flow control element (28), is sub-divided into a plurality of portions.

7. Air guiding element according to claim 1, characterised in that the base face (26) of the recess (24) is arranged substantially parallel to a portion of the outer surface of the housing base body (12) opposite the base face (26) or another base face of another recess opposite the base face (26), and/or the recess (24) is filled with a noise-absorbing material.

8. Air guiding element according to claim 1, characterised in that the air inlet opening (14) of the housing base body (12) is connected to an inflow element (20) which comprises a plurality of mutually inclined portions (20a, 20b, 20c, 20d, 20e, 20f), flow directing channels (22) which are orientated parallel to the direction of the air flow through the inflow element (20) being formed in at least some of the mutually inclined portions (20a, 20b, 20c, 20d, 20e, 20f) of the inflow element (20).

9. Air guiding element according to claim 1, characterised by a second flow control element (36) which, relative to the direction of the airflow through the air guiding element (10), is arranged downstream of the first flow control element (28), the second flow control element (36) comprising a plurality of air guiding channels.

10. Air guiding element according to claim 9, characterised in that each of the plurality of air guiding channels is sub-divided into a plurality of portions, and in that a different second flow control element (36) is arranged in each of these portions.

11. Air guiding element according to claim 9, characterised in that a flow-crossing sectional area of the housing base body (12), in a region of the second flow control element (36), is sub-divided into a plurality of portions, and in that a different second flow control element (36) is arranged in each of the portions.

12. Aircraft air conditioning system comprising an air guiding element (10) having a housing base body (12), in which an air inlet opening (14) and an air outlet opening (16) are constructed, a first flow control element (28) arranged in the housing base body (12), relative to the direction of air flow through the air guiding element (10), upstream of the air outlet opening (16), the first flow control element (28) comprising a plurality of air guiding channels (30) surrounded by a noise-absorbing material (32), a diffusor region (18) arranged in the housing base body (12) upstream of the first flow control element, and a recess (24) formed in the diffusor region (18), the recess (24) having a base face (26) recessed relative to an outer surface of the housing base body (12) in a direction toward an interior of the housing base body (12), the base face (26) having at least three sides each separate from and extending parallel to a different peripheral edge of the housing base body (12).

\* \* \* \* \*